US 9,601,762 B2

(12) United States Patent
Wietelmann et al.

(10) Patent No.: US 9,601,762 B2
(45) Date of Patent: Mar. 21, 2017

(54) PHOSPHOROUS-COATED LITHIUM METAL PRODUCTS, METHOD FOR PRODUCTION AND USE THEREOF

(71) Applicant: Rockwood Lithium GmbH, Frankfurt a. M. (DE)

(72) Inventors: Ulrich Wietelmann, Friedrichsdorf (DE); Christoph Hartnig, Eppstein (DE); Ute Emmel, Frankfurt am Main (DE); Sven Schröter, Darmstadt (DE)

(73) Assignee: Rockwood Lithium GmbH (DE)

( * ) Notice: Subject to any disclaimer, the term of this patent is extended or adjusted under 35 U.S.C. 154(b) by 204 days.

(21) Appl. No.: 14/371,901

(22) PCT Filed: Jan. 14, 2013

(86) PCT No.: PCT/EP2013/050571
§ 371 (c)(1),
(2) Date: Jul. 11, 2014

(87) PCT Pub. No.: WO2013/104788
PCT Pub. Date: Jul. 18, 2013

(65) Prior Publication Data
US 2015/0037682 A1 Feb. 5, 2015

(30) Foreign Application Priority Data
Jan. 13, 2012 (DE) ........................ 10 2012 200 460

(51) Int. Cl.
*H01M 4/36* (2006.01)
*H01M 4/58* (2010.01)
(Continued)

(52) U.S. Cl.
CPC ........... *H01M 4/366* (2013.01); *B22F 1/0088* (2013.01); *C22C 24/00* (2013.01); *C23C 8/40* (2013.01);
(Continued)

(58) Field of Classification Search
CPC .... H01M 4/366; H01M 4/382; H01M 4/5825; H01M 4/5805; C22C 24/00; B22F 1/02
See application file for complete search history.

(56) References Cited

U.S. PATENT DOCUMENTS 5,567,474 A 10/1996 Dover et al.
5,776,369 A 7/1998 Dover et al.
(Continued)

FOREIGN PATENT DOCUMENTS

WO 2007/005983 A2 1/2007
WO 2008/045557 A1 4/2008
(Continued)

OTHER PUBLICATIONS

Han, et al. "Lithium bis(fluorosulfonyl)imide(LiFSI) as conducting salt for nonaqueous liquid electrolytes for lithium-ion batteries: Physicochemical and electrochemical properties", J. of Power Sources 196, (2011), pp. 3623-3632.

*Primary Examiner* — Stewart Fraser
(74) *Attorney, Agent, or Firm* — Jeremy J. Kliebert

(57) ABSTRACT

A particulate lithium metal composite materials having a layer containing phosphorous and a method for producing said phosphorous-coated lithium metal products, characterized in that melted, droplet-shaped lithium metal is reacted in a hydrocarbon solvent with a phosphorous source that contains the phosphorous in the oxidation stage 3, and use thereof for the pre-lithiation of electrode materials and the production of battery anodes.

19 Claims, 1 Drawing Sheet

(51) Int. Cl.
  *B22F 1/00* (2006.01)
  *C22C 24/00* (2006.01)
  *H01M 4/38* (2006.01)
  *C23C 8/40* (2006.01)
  *B22F 1/02* (2006.01)
  *B22F 9/08* (2006.01)
  *H01M 4/587* (2010.01)
  *H01M 10/052* (2010.01)

(52) U.S. Cl.
  CPC ......... *H01M 4/382* (2013.01); *H01M 4/5805* (2013.01); *H01M 4/5825* (2013.01); *B22F 1/02* (2013.01); *B22F 2009/0804* (2013.01); *B22F 2304/10* (2013.01); *H01M 4/587* (2013.01); *H01M 10/052* (2013.01)

(56) References Cited

U.S. PATENT DOCUMENTS

| | | |
|---|---|---|
| 7,588,623 B2 | 9/2009 | Dover et al. |
| 7,776,385 B2 | 8/2010 | Muldoon et al. |
| 2004/0253510 A1 | 12/2004 | De Jonghe et al. |
| 2007/0082268 A1 | 4/2007 | Star et al. |
| 2008/0283155 A1* | 11/2008 | Yakovleva ............ B22F 1/0062 148/280 |
| 2009/0035663 A1* | 2/2009 | Yakovleva ............ B22F 1/0062 429/231.95 |
| 2009/0061321 A1 | 3/2009 | Yakovleva et al. |
| 2009/0220857 A1 | 9/2009 | Menke et al. |
| 2010/0024597 A1 | 2/2010 | Dover et al. |
| 2010/0028768 A1* | 2/2010 | Morita ................ H01M 2/1653 429/144 |
| 2011/0042610 A1* | 2/2011 | Cho ....................... B82Y 30/00 252/182.1 |
| 2011/0104366 A1 | 5/2011 | Muldoon et al. |
| 2011/0226987 A1 | 9/2011 | Yakovleva et al. |
| 2011/0281168 A1* | 11/2011 | Watanabe ............. H01M 4/525 429/223 |
| 2013/0122318 A1 | 5/2013 | Wietelmann |
| 2014/0134488 A1 | 5/2014 | Menke et al. |

FOREIGN PATENT DOCUMENTS

| | | |
|---|---|---|
| WO | 2010/101856 A1 | 9/2010 |
| WO | 2011/073324 A1 | 6/2011 |

\* cited by examiner

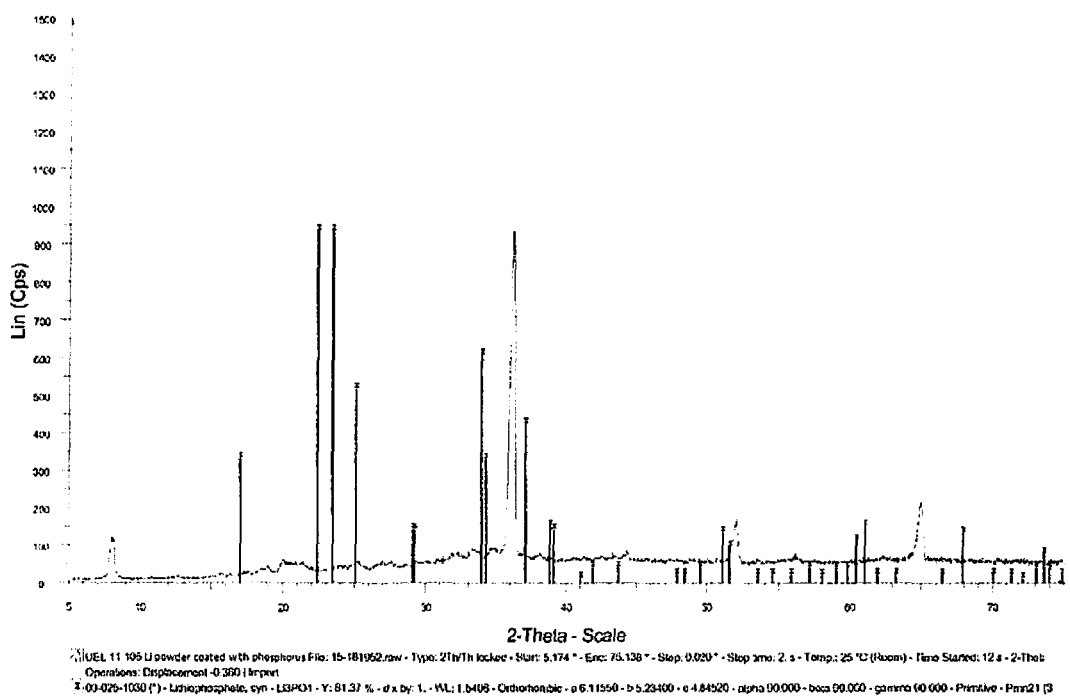

PHOSPHOROUS-COATED LITHIUM METAL PRODUCTS, METHOD FOR PRODUCTION AND USE THEREOF

This application is a §371 of International Application No. PCT/EP2013/050571 filed Jan. 14, 2013, and claims priority from German Patent Application No. 10 2012 200 460.2 filed Jan. 13, 2012.

The invention relates to particulate lithium metal composite materials having a layer containing phosphorus and a method for producing such a phosphorus-coated lithium metal product and use of same.

Rechargeable electrochemical storage systems are currently becoming increasing important for many fields of everyday life. In addition to the applications as automotive starter batteries and as energy sources for portable electronic devices, a great growth for driving electric automobiles and for stationary energy storage is predicted for the future. For the new applications, traditional lead/sulfuric acid batteries are out of the question because their capacitance is much too low and they are often inadequately cycleable. Lithium batteries, however, are thought to have the best chance.

Lithium batteries today do not contain any metallic lithium for safety reasons but instead use a graphitic material as the anode. However, the use of graphite, which, in the charged state, can be charged up to the limit composition $LiC_6$, results in a much lower capacitance, in comparison with the use of metallic lithium.

Lithium is an alkali metal. Like the heavy element homologs of the first main group, lithium is characterized by a strong reactivity with a variety of substances. It thus reacts violently with water, alcohols and other substances that contain protic hydrogen, often resulting in ignition. It is unstable in air and reacts with oxygen, nitrogen and carbon dioxide. It is therefore normally handled under an inert gas (noble gases such as argon) and is stored under a protective layer of paraffin oil.

Lithium also reacts with many functionalized solvents, even those that do not contain protic hydrogen. Cyclic ethers such as THF, for example, are opened by ring cleavage, whereas esters and carbonyl compounds in general are lithiated and/or reduced. The reaction between the aforementioned chemicals and/or environmental substances is often catalyzed by water. Lithium metal can therefore be stored and processed for long periods of time in dry air because it forms a somewhat stable passivation layer that prevents most corrosion. The same thing is also true of functionalized solvents, for example, N-methyl-2-pyrrolidone (NMP), which is much less reactive with lithium in anhydrous form than with a water content greater than a few 100 ppm.

To increase safety in processing and to improve the stability of lithium metal in storage, a number of corrosion-preventing coating methods have been developed. For example, it is known from U.S. Pat. No. 5,567,474 and U.S. Pat. No. 5,776,369 that molten lithium metal may be treated with $CO_2$. For the coating, molten lithium in an inert hydrocarbon is typically brought in contact with at least 0.3% $CO_2$ for at least one minute. However, the resulting protection is insufficient for many applications, specifically for prelithiation of battery electrode materials in an N-methyl-2-pyrrolidone (NMP) suspension.

Another method for stabilizing lithium metal consists of heating it to a temperature above its melting point, agitating the molten lithium and bringing it in contact with a fluorination agent, for example, perfluoropentylamine (WO 2007/005983 A2). It is a disadvantage that fluorinating agents are often toxic or caustic and therefore tend to be avoided in industrial practice.

Another method of protective surface treatment of lithium metal consists of coating it with a wax layer, for example, a polyethylene wax (WO 2008/045557 A1). It is a disadvantage that a relatively large amount of coating agent must be applied. In the examples in the aforementioned patent application, this amount is approximately 1%.

It is proposed in US 2009/0061321 A1 that a stabilized lithium metal powder be produced with an essentially continuous polymer coating. The polymer may be selected from the group of polyurethanes, PTFE, PVC, polystyrene, etc. One disadvantage of this method is that protected lithium metal has an unspecified surface coating of organic substances, which cause interference with its subsequent use, for example, for prelithiation of electrode materials.

In addition, an anode for an electrochemical cell containing a metallic material with an oxygen-based coating, is formed with a (additional) protective layer that is formed by reaction of D- or P-block precursors with this oxygen-containing layer (WO 2010/101856 A1, US 2007/0082268 A1, US 2009/0220857 A1). The protective layer of the metal anode material is produced by treating a metallic material, which has a coating that contains oxygen, with at least two compounds, wherein the first compound is a large molecular compound and the second compound is a small molecular compound (U.S. Pat. No. 7,776,385 B2, US 2011/0104366 A1). With this type of protective layer formation, surface groups that contain oxygen (for example, hydroxyl functions) react with the D- or P-block precursors, for example, a silicic acid ester in a nonhydrolytic sol-gel process, will react with one another and form a film consisting of $SiO_2$ on the anode surface. The treatment takes place at room temperature.

Finally, US 2008/0283155 A1 describes a method for stabilizing lithium metal, which is characterized by the following steps:
a) Heating lithium metal powder to a temperature above the melting point to produce molten lithium metal,
b) Dispersing the molten lithium metal, and
c) Bringing the molten lithium metal in contact with a substance that contains phosphorus to produce an essentially continuous protective layer of lithium phosphate on the lithium metal powder. Inorganic compounds with phosphorus in oxidation state 5 are listed as the substances containing phosphorus: phosphoric acid ($H_3PO_4$), $P_2O_5$ and $POF_3$. It is not easy to handle acidic hygroscopic solids (anhydrous phosphoric acid and $P_2O_5$) on an industrial scale. Handling of gaseous and toxic phosphorus oxyfluoride is particularly problematical.

Furthermore, the stability of a metal powder coated only once in N-methylpyrrolidone (NMP) is also completely inadequate. A product that is stable at 30° C. can be obtained only by an additional independent coating with a wax (LuwaxS dry powder).

The invention has taken as its object to provide a surface-stabilized anode material on a lithium metal basis with a high specific surface area which has a low reactivity and can be handled harmlessly in conventional equipment, its surface coating being ionically and electronically conductive, the surface coating containing the fewest possible problematical foreign elements (with regard to the respective battery chemistry), preferably none at all, as well as relating to a process for simple in particular one-step production of such a product.

This object is achieved by a particulate core/shell material consisting of a metal core and a shell comprised of a material that contains phosphorus. In addition, a method which permits the production of such a lithium metal with a high specific surface area and with a passivating but conductive sheathing is made possible.

The product according to the invention is preferably produced by reacting droplet-shaped molten lithium metal with a phosphorus source that serves as the passivating agent and contains the phosphorus in oxidation state 3, selected from the groups consisting of phosphonic acid, alkyl phosphonic acid, alkyl phosphonic acid dialkyl esters, alkyl phosphonic acid dihalides, alkenyl phosphonic acid, alkenyl phosphonic acid dihalides, alkenyl phosphonic acid dialkyl esters, phosphorous acid dialkyl esters (dialkyl phosphites), phosphorous acid dialkenyl esters and phosphorous acid diaryl esters, phosphorous acid trialkyl esters, phosphorous acid alkyl ester dihalides in a hydrocarbon-based solvent and at temperatures of at least 50° C. up to max. 300° C., preferably from 180° to 250° C. and particularly preferably from 180° C. to 220° C. The stoichiometric ratio between lithium and phosphorus is selected so as to obtain a composite material with a metal content of at least 90%, preferably at least 95% and particularly preferably at least 97%. This is the case in general when the molar ratio between Li metal and passivating agent is 100:0.01 to 100:5, preferably 100:0.05 to 100:1.

The following phosphorus compounds are especially preferred: anhydrous phosphonic acid (phosphoric acid), phosphoric acid dimethyl esters, phosphoric acid diethyl esters, phosphoric acid dipropyl esters, phosphoric acid dibutyl esters, phosphoric acid dibenzyl esters, phosphoric acid divinyl esters, phosphoric acid diallyl esters, phosphoric acid diphenyl esters, phosphoric acid methyl esters dichloride, phosphoric acid trimethyl esters, phosphoric acid triethyl esters, phosphoric acid tripropyl esters, phosphoric acid tributyl esters, methyl phosphonic acid, ethyl phosphonic acid, propyl phosphoric acid, butyl phosphonic acid, vinyl phosphonic acid, allyl phosphonic acid, benzyl phosphonic acid, vinyl phosphonic acid dichloride, vinyl phosphonic acid dimethyl esters, vinyl phosphonic acid diethyl esters, allyl phosphonic acid dichloride, allyl phosphonic acid dibutyl esters and the like. Phosphonic acid derivatives having at least one unsaturated hydrocarbon moiety (e.g., allyl, vinyl) are especially preferred. Phosphorus compounds of the substance groups listed that do not contain a halide are also especially preferred. Compounds with halogen-phosphorus bonds are cleaved on coming in contact with lithium, forming lithium halide. The lithium halide is deposited in the coating layer because it is insoluble in the hydrocarbon-based inert solvent that is used, i.e., particulate lithium containing both phosphorus and lithium halide in its shell is formed. When using a powder in a lithium battery which usually contains liquid electrolytes which in turn contain polar organic solvents, the lithium halide is dissolved and can then come in contact with all battery components. It is known that lithium halides, in particular LiCl, LiBr and LiI have a corrosive effect on the cathode current diverter (usually made of aluminum). This attack shortens the service life of a battery (see, for example, H. B. Han, J. Power Sources 196 (2011), 3623-32).

The preferred production conditions are to be selected so that the process starts with uncoated lithium drops with an average diameter of max. 500 µm, preferably max. 200 µm and particularly preferably max. 100 µm. According to the prior art, this is done by using an agitating element that produces high shearing forces, for example, a dispersing disk (toothed disk agitator) or an atomization agitator, for example, a dispersing agitator such as the Ultraturrax. Alternatively, the particles can also be produced by means of atomization process. In this case, molten lithium is sprayed into an inert gas atmosphere. The metal powder then obtained after cooling and solidifying can be dispersed in an inert organic solvent (usually a hydrocarbon) and reacted with several of the passivating agents according to the invention at temperatures below the melting point of lithium.

After the formation of lithium droplets or solid lithium particles (i.e., depending on the temperature selected) with the desired particle diameter, the reaction is carried out with one or more of the passivating agents that contain phosphorus according to the invention, to thereby induce the formation of a passivating but conductive surface coating. After the passivating conductive surface coating has been formed, the agitation and homogenization conditions are to be selected so as not to destroy the surface coating. This is achieved by a less abrasive agitation process.

Instead of a high-energy agitator, other dispersion methods consistent with the prior art, for example, ultrasonic atomization, may also be used.

The solvent is preferably selected from the group of saturated hydrocarbons. Solvents which are liquid at the selected reaction conditions, i.e., solvents having boiling points of at least 180° C., preferably at least 200° C. and particularly preferably >220° C. are preferred. Examples include decane, undecane, dodecane or any mixtures of the aforementioned compounds, regardless of whether they are linear, branched or cyclic. Most especially preferred are commercially available paraffin boiling cuts such as Shellsol® D70 or D100, for example.

The lithium metal that is used preferably has a purity of at least 98 wt %, and it is particularly preferably used in a battery quality. The sodium content is preferably less than 200 ppm, particularly preferably less than 100 ppm and most particularly preferably less than 50 ppm.

It has surprisingly been discovered that when using the passivating agents that contain phosphorus according to the invention, it is possible to produce stable lithium metal powder products that are stable for many hours in NMP with a water content of approx. 200 ppm at a temperature up to at least 50° C., preferably 80° C., i.e., they do not undergo any significant exothermic reaction, in particular no "runaway" phenomenon.

The product according to the invention is characterized by a high specific surface area due to the particulate, often spherical morphology and particle sizes, preferably <500 µm in comparison with the lithium film that is normally used. Preferred average particle sizes are between 1 and 500 µm, preferably 10 to 200 µm and particularly preferably between 15 and 100 µm.

The passivated lithium metal products according to the invention can be used for prelithiation of electrochemically active materials, for example, graphite, alloy or conversion anodes for lithium batteries or after a suitable mechanical physicochemical pretreatment (pressing, mixing with binder materials, etc.) they may be used for the production of metal anodes for lithium batteries.

The invention will now be explained in greater detail below on the basis of two examples and one FIGURE.

The product stability is determined by means of DSC (differential scanning calorimetry). An apparatus from the Systag company in Switzerland (the Radex system) may be used. Approx. 2 g NMP and 0.1 g lithium metal powder are weighed into the sample vessels under a protective gas atmosphere. Samples were stored for 15 hours at certain temperatures. The particle size distribution was determined using the Lasentec FBRM inline analyzer from the Mettler-Toledo company.

FIG. 1 shows an x-ray diffractogram of the product produced according to example 1, showing x: reflexes of lithium metal and lines: that would indicate reflex layers of $Li_3PO_4$ (none present)

EXAMPLES

Example 1

Production of Phosphorus-Coated Lithium from Molten Lithium Metal and 0.6 mol % Vinyl Phosphonic Acid at 210° C. in Paraffin Oil In an inertized (i.e., free of air and water, filled with Ar) stainless steel double-jacketed reactor equipped with a high energy agitating element (Ultraturrax), 19.6 g lithium metal was placed in 520 g Shellsol® D100 and melted at a jacket temperature of 210° C. while agitating. After completely melting, the lithium was processed to yield a fine emulsion with the help of the high-energy agitator (a few minutes at 16,000 revolutions per minute (rpm)). Then 1.69 g vinyl phosphonic acid (0.6 mol %) as a 30% blend with Shellsol® D100 was sprayed through a reactor opening within 3 minutes. After the end of this addition, the agitator was shut down, then the suspension was cooled to room temperature (RT) and forced onto a filter frit by means of a Teflon immersion tube, then washed (first with Shellsol®, then three times with pentane) and dried at RT until reaching a constant weight, yielding 20.0 g of a free-flowing powder with a gray metallic appearance.

Yield: 20.0 g (102% of the theoretical)

Average particle size: 50 μm

Metal content: 97.2% (gas volumetric)

P content: 1.65 wt %

Stability in NMP, water content 167 ppm: no significant exothermic reaction after 15 hours of storage at 80° C.; runaway reaction at 90° C. storage after about 1 hour; runaway reaction after a few minutes of storage at 100° C. X-ray diffractometry: very weak reflexes, possibly from elemental black phosphorus, but no lithium phosphate ($Li_3PO_4$) can be detected.

Example 2

Production of Phosphorus-Coated Lithium from Molten Lithium Metal and 0.3 mol % Vinyl Phosphonic Acid at 210° C. in Paraffin Oil In an inertized (i.e., free of air and water, filled with Ar) stainless steel double-jacketed reactor equipped with a high energy agitating element (Ultraturrax), 21.0 g lithium metal was placed in 506 g Shellsol® D100 and melted at a jacket temperature of 210° C. while agitating. After completely melting, the lithium was processed to yield a fine emulsion with the help of the high energy agitator. Then 1.09 g vinyl phosphonic acid (0.3 mol %) as a 30% mixture with Shellsol® D100 was sprayed through a reactor opening within 2 minutes. After the end of this addition, the agitator was shut down, then the suspension was cooled to RT and forced onto a filter frit by means of a Teflon immersion tube, then washed (first with Shellsol®, then three times with pentane) and dried at RT until reaching a constant weight, yielding 21.7 g of a free-flowing powder with a gray metallic appearance.

Yield: 21.7 g (103% of the theoretical)

Average particle size: 57 μm

Metal content: 97% (gas volumetric)

P content: 1.15 wt %

Stability in NMP, water content 167 ppm: no significant exothermic reaction after 15 hours of storage at 80° C.; no significant exothermic reaction within 15 hours of 90° C. storage.

The invention relates in particular to:

Particulate lithium metal composite material which has a core/shell morphology, wherein the shell consists of a composite material that contains P and the core consists of metallic lithium;

Composite material having a core/shell morphology wherein the shell contains P in the oxidation state of 3 or lower and the core consists of metallic lithium;

Composite material having a core/shell morphology, wherein the shell contains P in the oxidation state of 3 or lower and also does not contain any halogen, in particular no Cl, Br and/or I and the core consists of metallic lithium;

Composite material, wherein at least 90 wt %, preferably at least 95 wt % and particularly preferably at least 97 wt % of the lithium content is present in metallic form;

Composite material wherein the purity of the lithium metal used is at least 98 wt %;

Composite material wherein the sodium content, based on the total lithium content, is max. 200 ppm, preferably max. 100 ppm and particularly preferably max 50 ppm;

Composite material wherein the individual particles are no larger than 500 μm;

Composite material wherein the average particle size is between 1 and 500 μm, preferably between 10 and 200 μm and particularly preferably between 15 and 100 μm;

Method for producing a particulate phosphorus-coated lithium metal composite material wherein molten droplet-shaped lithium metal in a hydrocarbon solvent is reacted with a phosphorus source containing the phosphorus in the oxidation state 3, selected from the groups comprising phosphonic acid, alkyl phosphonic acid, alkyl phosphonic acid dialkyl esters, alkyl phosphonic acid dihalides, alkenyl phosphonic acid, alkenyl phosphonic acid dihalides, alkenyl phosphonic acid dialkyl esters, phosphorous acid dialkyl esters (dialkyl phosphites), phosphorous acid dialkenyl esters and phosphorous acid diaryl esters, phosphorous acid trialkyl esters, phosphorous acid alkyl ester dihalides;

Method in which the preferred phosphorus source is phosphonic acid derivatives containing at last one unsaturated hydrocarbon moiety (e.g., allyl, vinyl);

Method in which preferably phosphonic acid or phosphonic acid derivatives that do not contain any halogen, in particular no Cl, Br and/or I are used as the phosphorus source;

Method in which the reaction is carried out at temperatures in the range of 50° C. to max. 300° C., preferably 180° to 250° C. and particularly preferably 180° C. to 220° C.;

Method in which saturated solvents which are liquid under the particularly preferred reaction conditions are used as the saturated solvents, so they have boiling points of at least 180° C., preferably at least 200° C. and in particular preferably boiling points >220° C.;

Method in which preferably decane, undecane, dodecane or any mixtures of these compounds, regardless of whether they are linear, branched or cyclic are used as the hydrocarbon solvent;

Method in which particularly preferred commercially available paraffin boiling cuts such as, for example, Shellsol® D70 or D100 are used as the hydrocarbon solvent;

Use of the particulate phosphorus-coated lithium metal composite material for prelithiation of electrochemically active materials, for example, graphite, alloy or conversion anodes for lithium batteries;

Use of the particulate phosphorus-coated lithium metal composite material for the production of electrodes, in particular anodes for lithium batteries.

The invention claimed is:

1. A particulate lithium metal composite material having a core and a shell, wherein the shell comprises a material that contains phosphorus in an oxidation state of 3 or lower, and the core comprises metallic lithium.

2. The composite material according to claim 1, wherein the shell does not contain any lithium phosphate detectable by x-ray diffractometry.

3. The composite material according to claim 1, wherein the composite material has a content of metallic lithium of at least 90 wt %.

4. The composite material according to claim 1, wherein the metallic lithium has a purity of at least 98 wt %.

5. The composite material according to claim 1, wherein the sodium content of the composite material based on the total lithium content is a maximum of 200 ppm.

6. The composite material according to claim 1, wherein the composite material comprises individual particles that are no larger than 500 μm.

7. The composite material according to claim 1, wherein the composite material has an average particle size is between 1 and 500 μm.

8. The composite material according to claim 1, wherein the particulate lithium metal composite material is produced by reacting droplet-shaped molten lithium metal with a phosphorus source, wherein the phosphorus source is selected from the group consisting of phosphonic acid, alkyl phosphonic acid, alkyl phosphonic acid dialkyl esters, alkyl phosphonic acid dihalides, alkenyl phosphonic acid, alkenyl phosphonic acid dihalides, alkenyl phosphonic acid dialkyl esters, phosphorous acid dialkyl esters, phosphorous acid dialkenyl esters, phosphorous acid diaryl esters, phosphorous acid trialkyl esters and phosphorous acid alkyl ester dihalides.

9. The composite material according to claim 1 wherein the shell consists of the material that contains phosphorus and the core consists of metallic lithium.

10. A method comprising the steps of:
reacting molten droplet-shaped lithium metal in a hydrocarbon solvent with a phosphorus source to produce a particulate lithium metal composite material having a core and a shell, wherein the core comprises metallic lithium and the shell comprises a material containing phosphorous;
wherein the phosphorus source is in an oxidation state of 3, and the phosphorous source is selected from the group consisting of phosphonic acid, alkyl phosphonic acid, alkyl phosphonic acid dialkyl esters, alkyl phosphonic acid dihalides, alkenyl phosphonic acid, alkenyl phosphonic acid dihalides, alkenyl phosphonic acid dialkyl esters, phosphorous acid dialkyl esters, phosphorous acid dialkenyl esters, phosphorous acid diaryl esters, phosphorous acid trialkyl esters and phosphorous acid alkyl ester dihalides.

11. The method according to claim 10, wherein the phosphorus source comprises phosphonic acid derivatives containing at least one unsaturated hydrocarbon moiety.

12. The method according to claim 11, wherein the phosphorus source does not contain a halogen.

13. The method according to claim 10, wherein the reacting step is carried out at a temperature in the range of 50° C. to 300° C.

14. The method according to claim 10, wherein the hydrocarbon solvent comprises a saturated solvent having a boiling point of at least 180° C.

15. The method according to claim 10, wherein the hydrocarbon solvent comprises at least one member selected from the group consisting of decane, undecane and dodecane.

16. The method according to claim 10, wherein the hydrocarbon solvent comprises paraffin boiling cuts.

17. The method according to claim 10, wherein the shell consists of the material that contains phosphorus and the core consists of metallic lithium.

18. A method comprising the steps of:
prelithiating a particulate lithium metal composite material with an electrochemically active material;
wherein the particulate lithium metal composite material has a shell and a core, wherein the core comprises metallic lithium, and wherein the shell comprises a material containing phosphorous in an oxidation state of 3 or lower.

19. An electrode comprising a particulate lithium metal composite material having a shell and a core, wherein the core comprises metallic lithium, and wherein the shell comprises a material containing phosphorous in an oxidation state of 3 or lower.

* * * * *